United States Patent
Malhotra et al.

(10) Patent No.: US 9,693,373 B1
(45) Date of Patent: Jun. 27, 2017

(54) MEDIA SESSION TRANSFER BETWEEN COMMUNICATION NETWORKS

(71) Applicant: Sprint Communications Company L.P., Overland Park, KS (US)

(72) Inventors: Rajil Malhotra, Olathe, KS (US); Saravana Velusamy, Olathe, KS (US); Asfaw Negeri, Overland Park, KS (US); Ashish Bhan, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 33 days.

(21) Appl. No.: 14/220,296

(22) Filed: Mar. 20, 2014

(51) Int. Cl.
*H04W 76/02* (2009.01)

(52) U.S. Cl.
CPC .................... *H04W 76/02* (2013.01)

(58) Field of Classification Search
CPC ............... H04W 60/005; H04W 36/14; H04W 36/0022; H04W 72/048; H04W 36/08; H04W 76/02; H04W 76/026; H04W 88/16
See application file for complete search history.

(56) References Cited

U.S. PATENT DOCUMENTS

| 8,489,682 B2 | 7/2013 | Åström et al. |
| 8,504,635 B2 | 8/2013 | Benco et al. |
| 2009/0190550 A1 | 7/2009 | Giustina et al. |
| 2012/0120914 A1* | 5/2012 | Sedlacek ............. H04W 60/005 370/331 |
| 2013/0053027 A1 | 2/2013 | Lau et al. |
| 2013/0231107 A1 | 9/2013 | Mannepally |
| 2014/0269611 A1* | 9/2014 | Ionescu ............. H04W 36/0022 370/331 |

FOREIGN PATENT DOCUMENTS

WO      2013185846      12/2013

\* cited by examiner

*Primary Examiner* — Redentor Pasia
*Assistant Examiner* — Peter Mak

(57) ABSTRACT

In a communication system, a translation server individually associates session control servers with transfer control servers. One of the session control servers receives a registration for a User Equipment (UE) over a first network. The translation server associates the UE with the session control server in the data structure. The session control server exchanges first control signaling with the UE to establish a media session over the first network. The translation server receives a session transfer request for the UE from a second network. The translation server processes the data structure to identify the transfer control server that is associated with the session control server that is associated with the UE. The translation server transfers the session transfer request to the transfer control server. The transfer control server exchanges second control signaling with the second network to transfer the media session from the first network to the second network.

18 Claims, 10 Drawing Sheets

MEDIA SESSION TRANSFER BETWEEN COMMUNICATION NETWORKS

TECHNICAL BACKGROUND

In the field of wireless communications, Long Term Evolution (LTE) networks provide User Equipment (UE) with Internet access and voice calling service. The wireless voice calling service is referred to as Voice over LTE (VoLTE). LTE networks often use an Internet Multimedia Subsystem (IMS) to control these VoLTE sessions. When the UE registers on the LTE network, the LTE network assigns an IMS Proxy Call Session Control Function (P-CSCF) server to the UE. The UE then registers for VoLTE service with the IMS P-CSCF.

The UE may engage in wireless voice calls over the LTE network under the control of IMS. Unfortunately, the UE may lose wireless signal strength on the LTE network and change to a different wireless access network. If a VoLTE session is active for the UE (and perhaps if the UE is a single-radio UE), then the new wireless access network will contact an Access Transfer Control Function (ATCF) in IMS to control the access network transfer for the voice session. To prepare for these access transfers, numerous access network nodes need to have current contact information for the IMS ATCFs on a per-session and per-UE basis.

If the LTE network changes the P-CSCF for a UE during LTE registration, then the ATCF for the UE also changes since P-CSCFs and ATCFs are individually paired. The IMS system detects the P-CSCF/ATCF change for the UE during VoLTE registration. The IMS system pushes the P-CSCF/ATCF change for the UE to the various access systems for use in subsequent access network transfers during VoLTE sessions.

TECHNICAL OVERVIEW

In a communication system, a translation server individually associates session control servers with transfer control servers. One of the session control servers receives a registration for a User Equipment (UE) over a first network. The translation server associates the UE with the session control server in the data structure. The session control server exchanges first control signaling with the UE to establish a media session over the first network. The translation server receives a session transfer request for the UE from a second network. The translation server processes the data structure to identify the transfer control server that is associated with the session control server that is associated with the UE. The translation server transfers the session transfer request to the transfer control server. The transfer control server exchanges second control signaling with the second network to transfer the media session from the first network to the second network.

DETAILED DESCRIPTION

Figure 1:
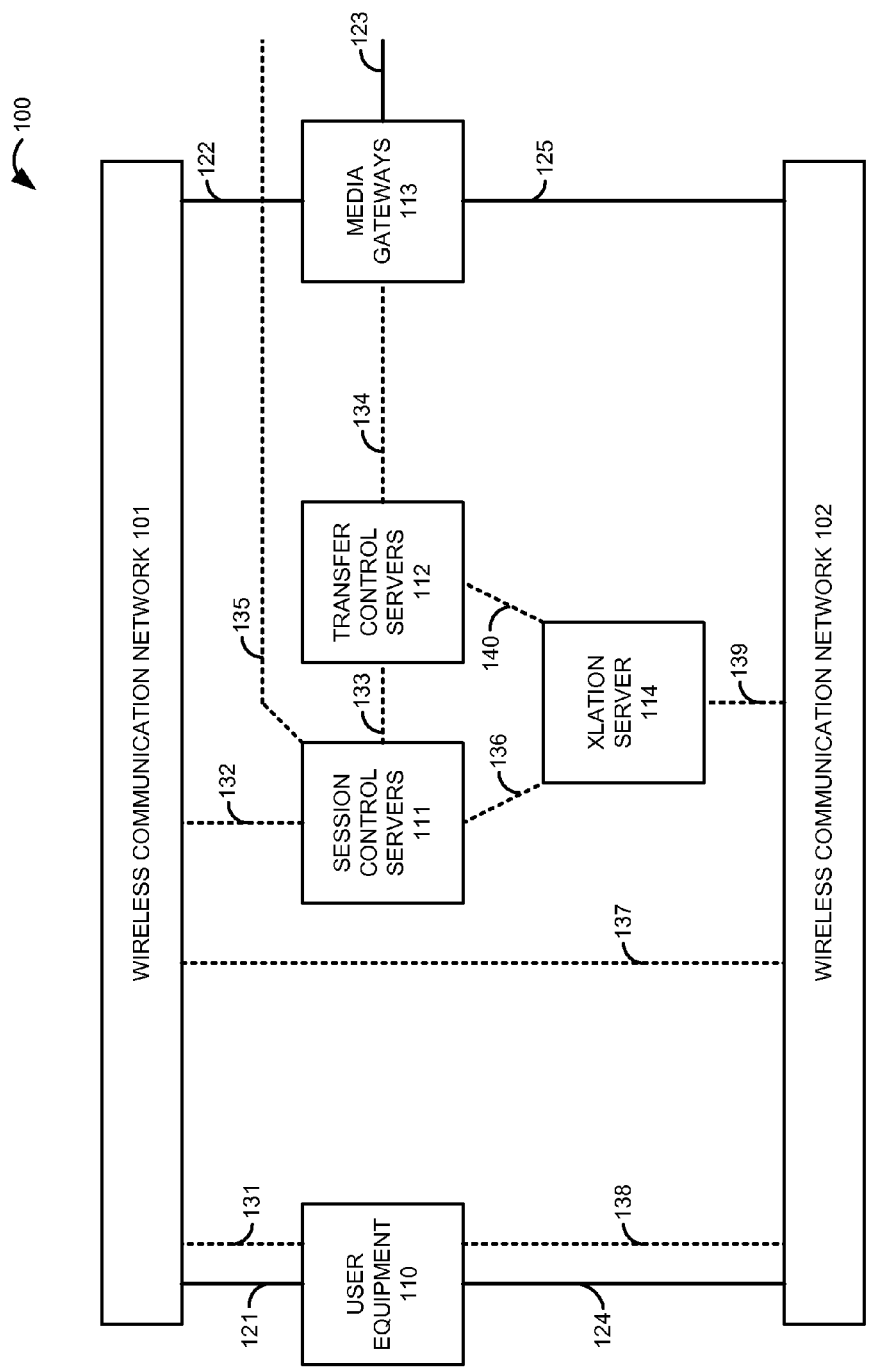
FIG. 1 illustrates a communication system to transfer media sessions between wireless communication networks for User Equipment (UE).

FIG. 1 illustrates communication system 100 to transfer media sessions between wireless communication networks 101-102 for User Equipment (UE) 110. Communication system 100 comprises session control servers 111, transfer control servers 112, media gateways 113, and translation server 114. UE 110 engages in media sessions over wireless communication networks 101-102 through media gateways 113. The media transferred over these media sessions might be audio, video, graphics, and the like. UE 110 comprises a phone, computer, media player, internet appliance, or some other apparatus having media components. Only one UE is shown for clarity, but there would typically be many more UEs that operate in a similar manner.

Wireless communication networks 101-102 comprise Long Term Evolution (LTE), High Speed Packet Access (HSPA), Evolution Data Optimized (EVDO), Global System for Mobile Communications (GSM), Code Division Multiple Access (CDMA), Wireless Fidelity (WiFi), Worldwide Interoperability for Microwave Access (WiMAX), or some other wireless communication system that supports wireless media sessions.

UE 110 and wireless communication network 101 communicate over data link 121 to transfer media over media sessions. Wireless communication network 101 and media gateways 113 communicate over data link 122 to transfer the media for the media sessions. Media gateways 113 and various other data systems (not shown) communicate over data link 123 to transfer the media for the media sessions.

UE 110 and wireless communication network 101 communicate over control link 131 to control these media sessions. Communication network 101 and session control servers 111 communicate over control link 132 to control the media sessions. Session control servers 111 and transfer control servers 112 communicate over control link 133 to control the media sessions. Transfer control servers 112 and media gateways 113 communicate over control link 134 to control the media sessions. Session control servers 111 and various control systems (not shown) communicate over control link 135 to control the media sessions.

Session control servers 111 and translation server 114 communicate over control link 136 to transfer the wireless access for some of the media sessions for UE 110 from network 101 to network 102. Communication network 101 and communication network 102 communicate over control link 137 to transfer and control these media sessions. UE 110 and wireless communication network 102 communicate over control link 138 to transfer and control the media sessions. Wireless communication network 102 and translation server 114 communicate over control link 139 to transfer and control the media sessions. Translation server 114 and transfer control servers 112 communicate over control link 140 to transfer and control the media sessions. Transfer control servers 112 and session control servers 111 communicate over control link 133 to transfer and control the media sessions. Transfer control servers 112 and media gateways 113 communicate over control link 134 to transfer and control the media sessions.

UE 110 and wireless communication network 102 communicate over data link 121 to transfer media over the transferred media sessions. Communication network 102 and media gateways 113 communicate over data link 125 to transfer the media for the transferred media sessions. As before, one of media gateways 113 and the other data systems (not shown) communicate over data link 123 to transfer the media for the transferred media sessions.

To perform the media session transfers, session control servers 111 provide associations between UE 110 and individual session control servers to translation server 114. Translation server 114 has a data structure that correlates these individual session control servers to individual transfer control servers 112. When wireless communication network 102 transfers a session transfer request for UE 110 to translation server 114, translation server 114 processes a UE 110 identifier through the data structure to identify the appropriate transfer control server. Translation server 114 forwards the session transfer request to the identified transfer control server. The identified transfer control server then directs the media session transfer responsive to the transfer request.

Servers and gateways 111-114 comprise computer and communication circuitry, data storage equipment, and associated software/hardware components. Links 121, 124, 131, and 138 comprise wireless links suitable for wireless communication networks 101-102. Links 121-125 and 131-140 utilize various communication and control protocols, such as LTE, GSM, CDMA, Internet Protocol (IP), Ethernet, Session Initiation Protocol (SIP), Diameter, Real-time Transfer Protocol (RTP), and/or some other format—including combinations thereof. Links 121-125 and 131-140 may include intermediate devices, systems, and networks.

Figure 2:
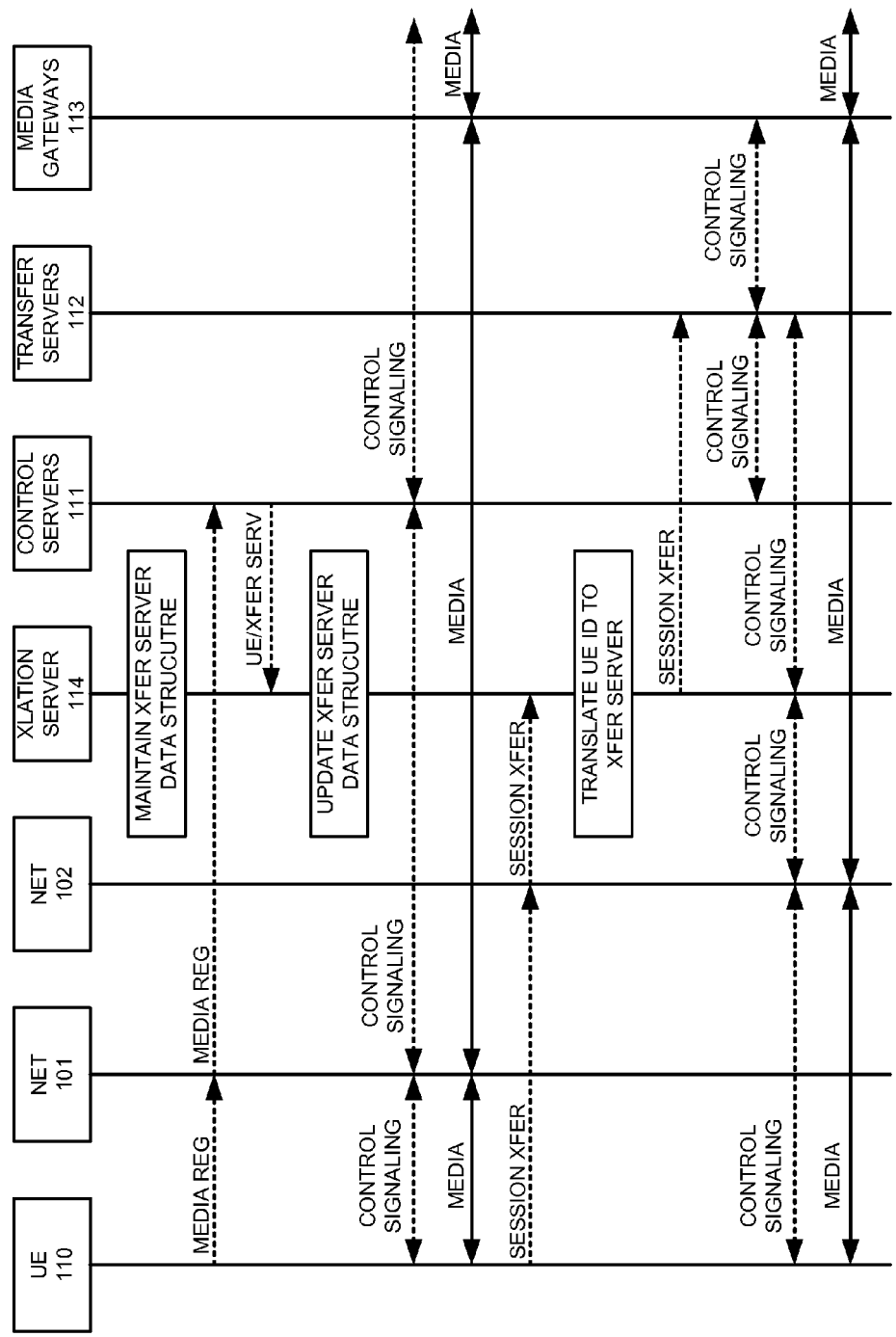
FIG. 2 illustrates the operation of the communication system to transfer media sessions between wireless communication networks for User Equipment (UE).

FIG. 2 illustrates the operation of communication system 100 to transfer media sessions for UE 110 between wireless communication networks 101-102. Translation server 114 maintains a data structure that individually associates session control servers 111 with transfer control servers 112. UE 110 transfers a media service registration to an individual one of session control servers 111 over wireless communication network 101. Wireless communication network 101 may have selected this session control server for UE 110 during wireless service registration. This session control server then transfers data to translation server 114 indicating the association of itself with UE 110. Translation server 114 updates its data structure to associate UE 110 with the session control server that is already associated with an individual transfer control server in the data structure. The session control server exchanges control signaling with UE 110 to establish a media session over wireless communication network 101. UE 110 then exchanges media for the media session through network 101 and one of media gateways 113.

UE 110 sends a session transfer request for the media session to wireless communication network 102. In some cases, networks 101-102 and UE 110 have already exchanged control signaling to make the session transfer decision. For example, UE 110 may be losing signal strength on wireless communication network 101 while maintaining adequate signal strength on wireless communication network 102 during an active video session. Wireless communication network 102 forwards the session transfer request to translation server 114.

Translation server 114 receives the session transfer request for UE 110 from wireless communication network 102. Translation server 114 processes its data structure to identify the individual transfer control server that is associated with the individual session control server that is associated with UE 110. In some cases, this data structure processing comprises translating a general session transfer number associated with a group of transfer control servers into an individual session transfer number specific to one transfer control server. Translation server 114 transfers the session transfer request to the appropriate one of transfer control servers 112.

To transfer the media session, the transfer control server exchanges control signaling with its associated session control server, and the transfer control server exchanges control signaling with wireless communication network 102 through translation server 114. Wireless communication network 102 and UE 110 exchange control signaling to implement the transfer. Likewise, the transfer control server exchanges control signaling with the media gateway for the session. In response to this control signaling, UE 110 exchanges media for the transferred media session over wireless communication network 102, and wireless network 102 exchanges the media for the transferred session with the serving media gateway. The serving media gateway continues to exchange the media with other systems (not shown) as it did before the media session transfer.

Figure 3:
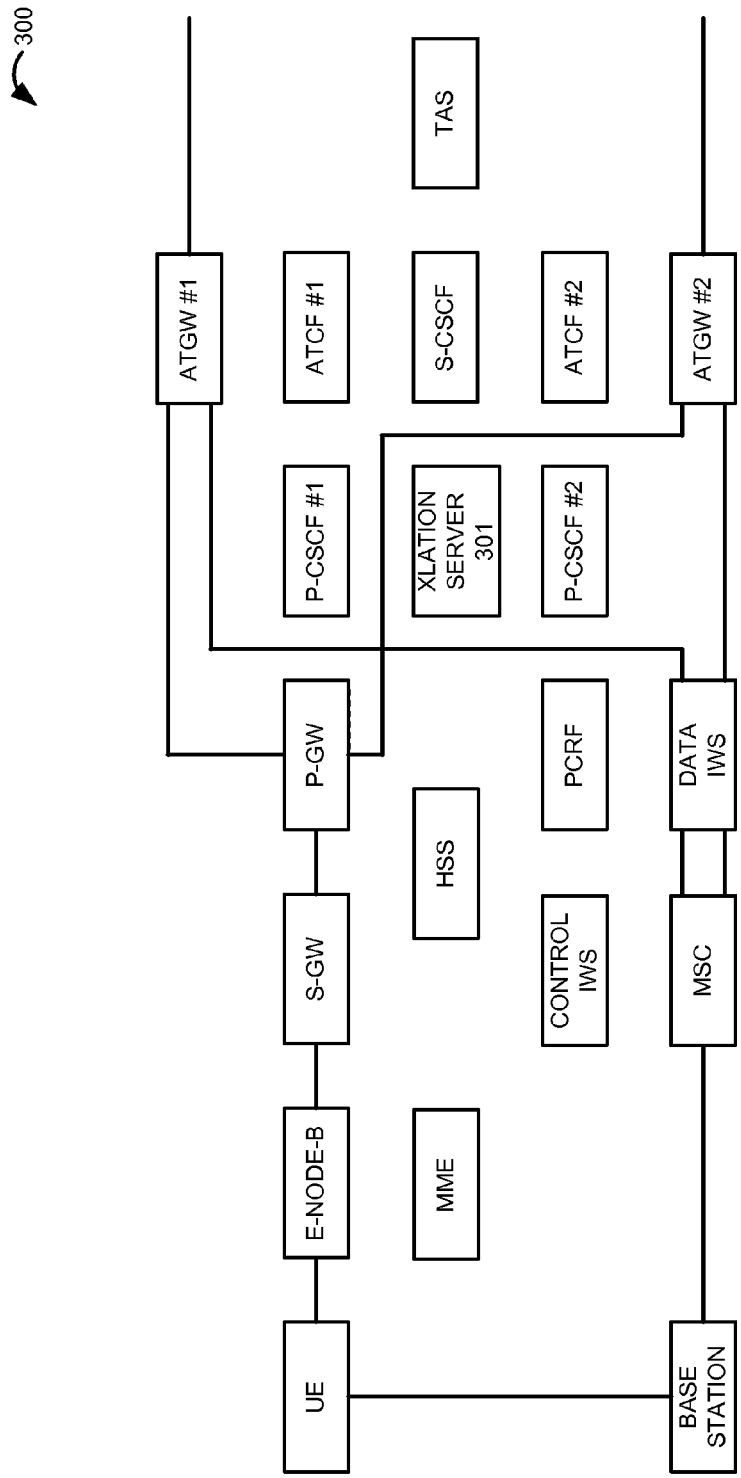
FIG. 3 illustrates a communication system having a translation server to transfer media sessions for User Equipment (UE) from a Long Term Evolution (LTE) network to a wireless voice network.

FIG. 3 illustrates communication system 300 having translation server 301 to transfer media sessions for User Equipment (UE) from a Long Term Evolution (LTE) network to a wireless voice network. Communication system 300 is an example of communication system 100, although system 100 may use alternative configurations and operations. Communication system 300 comprises the following LTE network elements: eNodeB, Service Gateway (S-GW), Packet Data Network Gateway (P-GW), Mobility Management Entity (MME), Policy Charging and Rules Function (PCRF), and Home Subscriber System (HSS). Communication system 300 comprises the following wireless voice network element: wireless base station, Mobile Switching Center (MSC), control Interworking System (IWS), and data IWS. Communication system 300 comprises the following Internet Multimedia Subsystem (IMS) network elements: Serving Call Session Control Function (S-CSCF), Telephony Application Server (TAS), Proxy Call Session Control Function (P-CSCF) #1, Access Transfer Control Function (ATCF) #1, Access Transfer Gateway (ATGW) #1, P-CSCF #2, ATCF #2, and ATGW #2. There could be additional P-CSCF/ATCF/ATGW groups in the IMS network.

FIG. 3 shows data links and omits control links for clarity. The LTE network provides data paths from the UE to both ATGW #1 and ATGW #2 over the eNodeB, S-GW, and P-GW Likewise, the wireless voice network provides data paths from the UE to both ATGW #1 and ATGW #2 over the wireless base station, MSC, and data IWS. Thus, UE may use either ATGW #1 or #2 for a media session and then transfer the wireless access for this media session from the LTE network to the wireless voice network. In some examples, the media transfer comprises a Circuit Switch Fall Back (CSFB) from the LTE network to a GSM network or a CDMA network.

Figure 4:
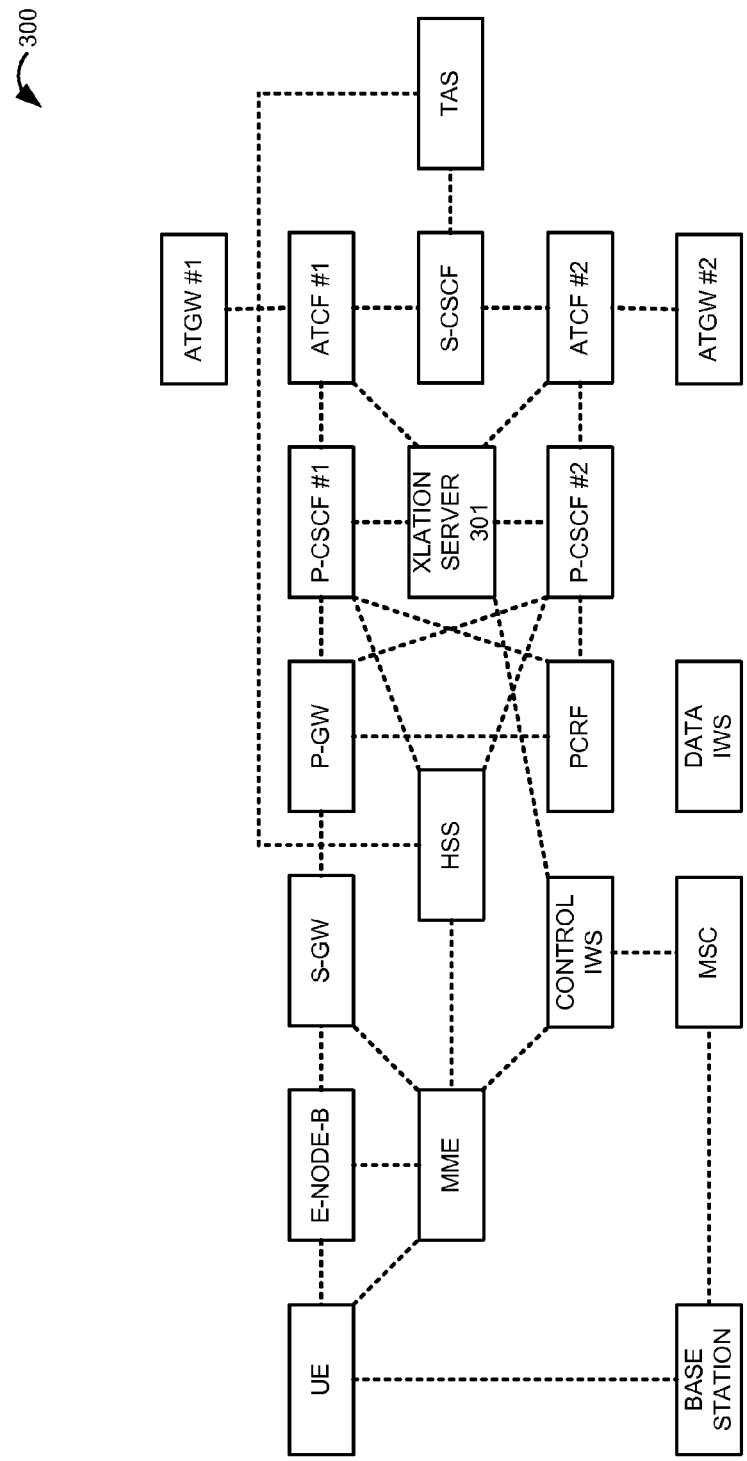
FIG. 4 illustrates the communication system having the translation server to transfer media sessions for User Equipment (UE) from a Long Term Evolution (LTE) network to a wireless voice network.

FIG. 4 illustrates communication system 300 to transfer media sessions for the UE from the LTE network to the wireless voice network. FIG. 4 shows the control links and omits the data links for clarity. Note the control link between the MME and the MSC through the control IWS. Also note the various control links from translation server 301 to the P-CSCFs, ATCFs, and the MSC (through the control IWS). The UE uses the LTE/IMS networks to establish the media session and then uses the LTE/IMS/voice networks to transfer the wireless access for the media session from the LTE network to the voice network. In some examples, the media transfer comprises a Circuit Switch Fall Back (CSFB) from the LTE network to a circuit switched wireless network.

Figure 5:
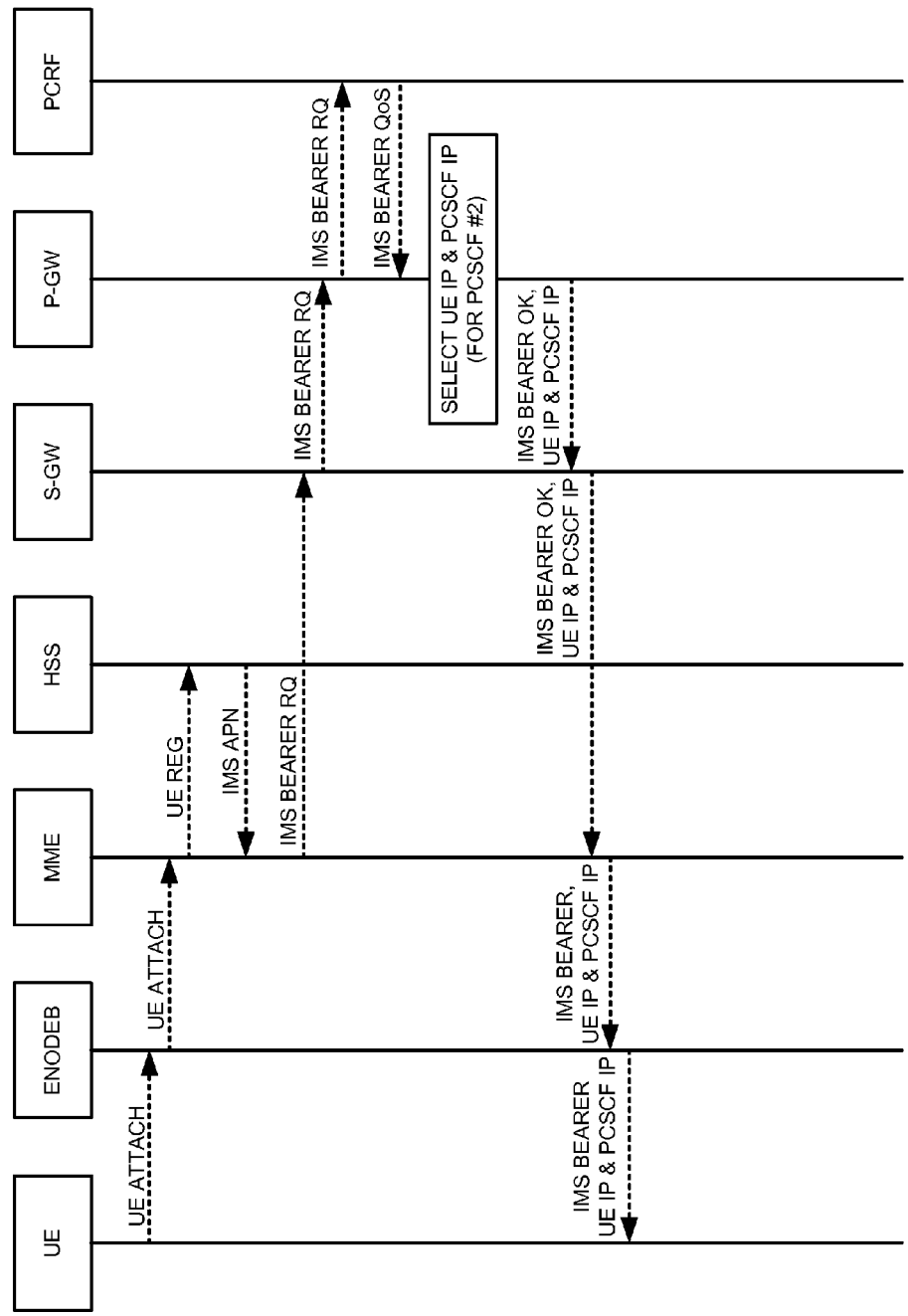
FIG. 5 illustrates the operation of the communication system having the translation server to transfer media sessions for User Equipment (UE) from a Long Term Evolution (LTE) network to a wireless voice network.

FIG. 5 illustrates the operation of communication system 300 to transfer media sessions for the UE from the LTE network to the wireless voice network. The UE initially performs wireless attachment to the eNodeB. The eNodeB transfers an attachment message for the UE to the MME. The MME transfer an LTE registration for the UE to the HSS. The HSS processes the LTE registration and returns an IMS Access Point Name (APN) and perhaps an Internet APN as well. In some examples, the UE is identified as a Single Radio (SR) voice session device during this LTE registration.

In response to the IMS APN, the MME transfers an IMS bearer request to the S-GW. The S-GW transfers the IMS bearer request to the P-GW. The P-GW interacts with the PCRF to obtain a QoS and other control parameters for the IMS bearer. The P-GW selects an IP address for the UE, and the UE IP may be selected during a contemporaneous default bearer set-up for an internet APN. The P-GW also selects an IP address of a P-CSCF for the IMS bearer, and P-CSCF #2 is selected in this example. The P-GW transfers an IMS bearer OK message to the S-GW indicating the UE IP and P-CSCF #2 IP. The S-GW transfers an IMS bearer OK message to the MME indicating the UE IP and P-CSCF #2 IP. The MME transfers an IMS bearer OK message to the UE over the eNodeB indicating the UE IP and P-CSCF #2 IP.

Note that the P-GW selects the IMS P-CSCF for the UE during LTE registration. The PCRF or the HSS may specify this P-CSCF to the UE or provide data that drives the P-GW to select a particular P-CSCF. The P-GW may change its P-CSCF selection on the next LTE registration for the same UE. This P-CSCF change will cause a modification to the ATCF and the ATGW that will serve the UE.

Figure 6:
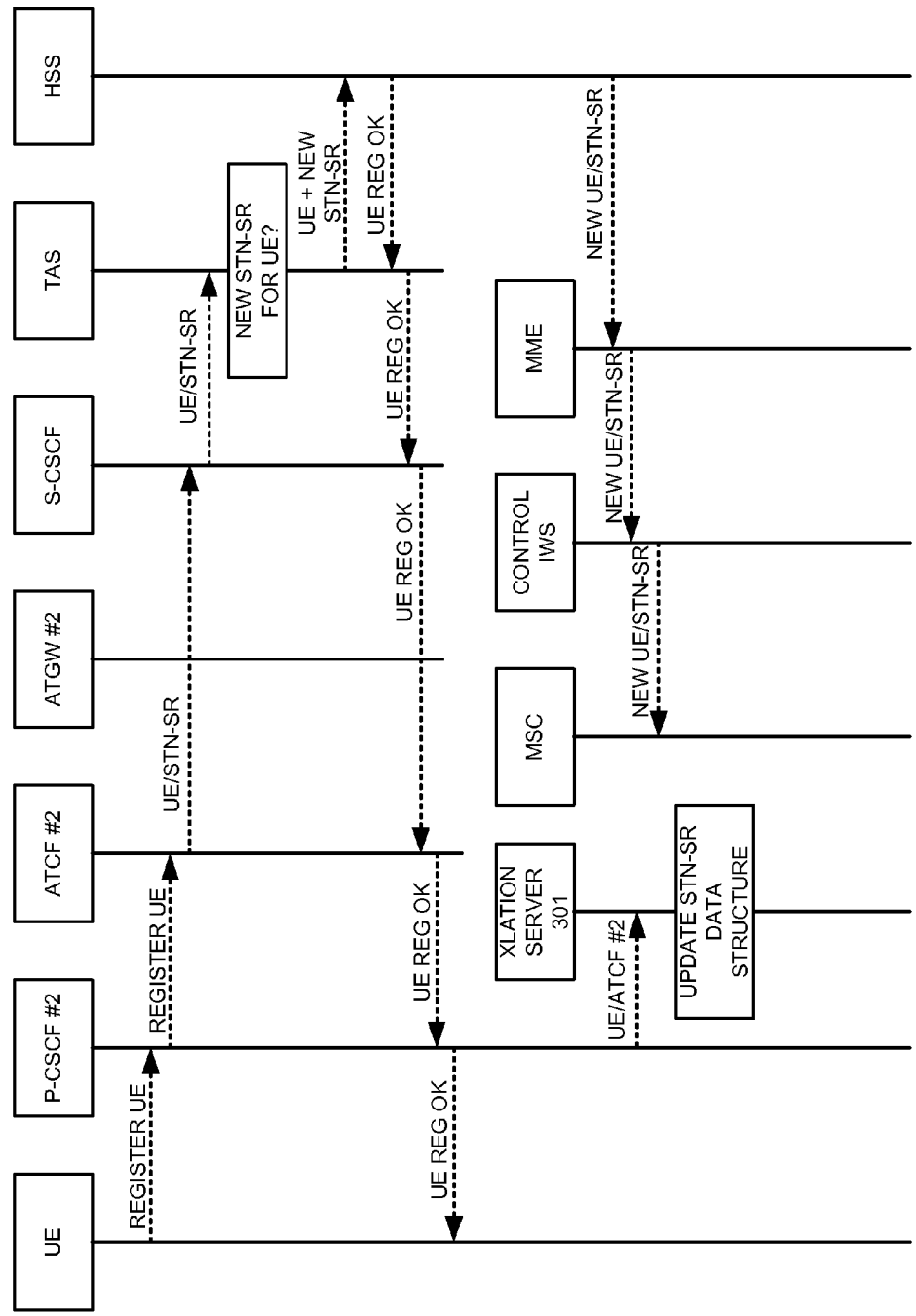
FIG. 6 illustrates the operation of the communication system having the translation server to transfer media sessions for User Equipment (UE) from a Long Term Evolution (LTE) network to a wireless voice network.

FIG. 6 illustrates the operation of communication system 300 to transfer media sessions for the UE from the LTE network to the wireless voice network. The UE transfers an IMS registration to P-CSCF #2 based on the P-CSCF IP address from the LTE P-GW. The P-CSCF #2 transfers the IMS registration for the UE to ATCF #2. The ATCF #2 transfers the IMS registration for the UE to the S-CSCF and includes a Session Transfer Number-Single Radio (STN-SR) for the ATCF #2 for use by the MSC in a potential session transfer. The S-CSCF transfers the IMS registration for the UE and the STN-SR for the ATCF #2 to the TAS. The TAS interacts with the HSS to authorize the IMS registration. The TAS determines if the STN-SR for the UE is different and updates the HSS with the new STN-SR (if any). The TAS returns an IMS registration OK message which is forwarded on to the UE through the S-CSCF, ATCF #2, and P-CSCF #2. In some examples, the UE is identified as a Single Radio (SR) voice session device during this IMS registration.

If the STN-SR from the TAS is an update, the HSS records the new STN-SR for the UE. The HSS also transfers the STN-SR update for the UE to the MME. The MME transfers the STN-SR update for the UE to the MSC through the control IWS. The STN-SR will be different/new for the UE if the P-GW selects a different P-CSCF for the UE during LTE registration.

In response to the IMS registration, P-CSCF #2 also transfers the UE/P-CSCF #2 association to translation server 301. Translation server 301 associates the UE with the P-CSCF #2 and P-CSCF #2 with ATCF #2 in its data structure.

Figure 7:
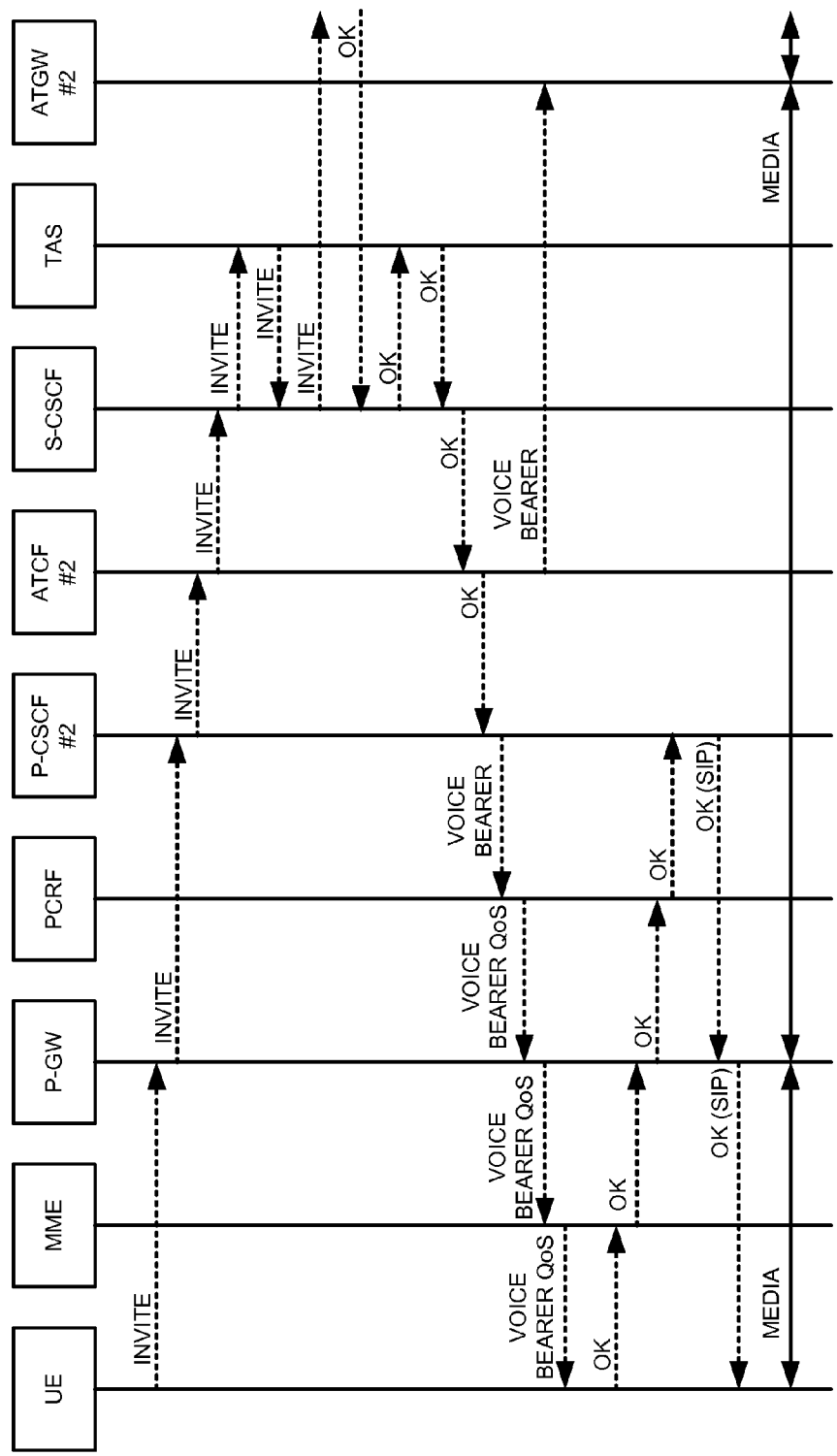
FIG. 7 illustrates the operation of the communication system having the translation server to transfer media sessions for User Equipment (UE) from a Long Term Evolution (LTE) network to a wireless voice network.

FIG. 7 illustrates the operation of communication system 300 to transfer media sessions for the UE from the LTE network to the wireless voice network. The UE transfers a SIP invite message for a voice session to P-CSCF #2 over its IMS bearer through the LTE P-GW. The P-CSCF #2 transfers the invite message to ATCF #2, and ATCF #2 transfers the invite message to the S-CSCF. The S-CSCF transfers the invite to the TAS which returns a corresponding invite message to the S-CSCF. The S-CSCF transfers the invite to a far-end system which eventually returns a SIP OK message for the voice session. The S-CSCF transfers the OK to the TAS which returns a corresponding OK message to the S-CSCF. The S-CSCF transfers the OK to the ATCF #2, and the ATCF #2 transfers the SIP OK to the P-CSCF #2. The ATCF #2 transfers a voice bearer instruction (P-GW information) to ATGW #2 for the UE.

In response to the SIP OK, the P-CSCF #2 instructs the LTE PCRF to add a voice bearer for the UE. The PCRF adds QoS and other parameters and instructs the P-GW to add the voice bearer for the UE. The P-GW transfers the voice bearer instruction to the MME (through the S-GW), and the MME which transfers a voice bearer instruction to the UE for authorization. The UE transfers an OK for the voice bearer to the MME, and the bearer OK is sent from the MME thru the S-GW to the P-GW. The P-GW transfers the voice bearer OK to the PCRF and the PCRF transfers the voice bearer OK to the P-CSCF #2.

In response to the voice bearer OK from the PCRF, the P-CSCF #2 transfers a SIP OK message to the UE over the IMS bearer. A media session is then established between the UE and the far-end system over the LTE P-GW and the ATGW #2.

Figure 8:
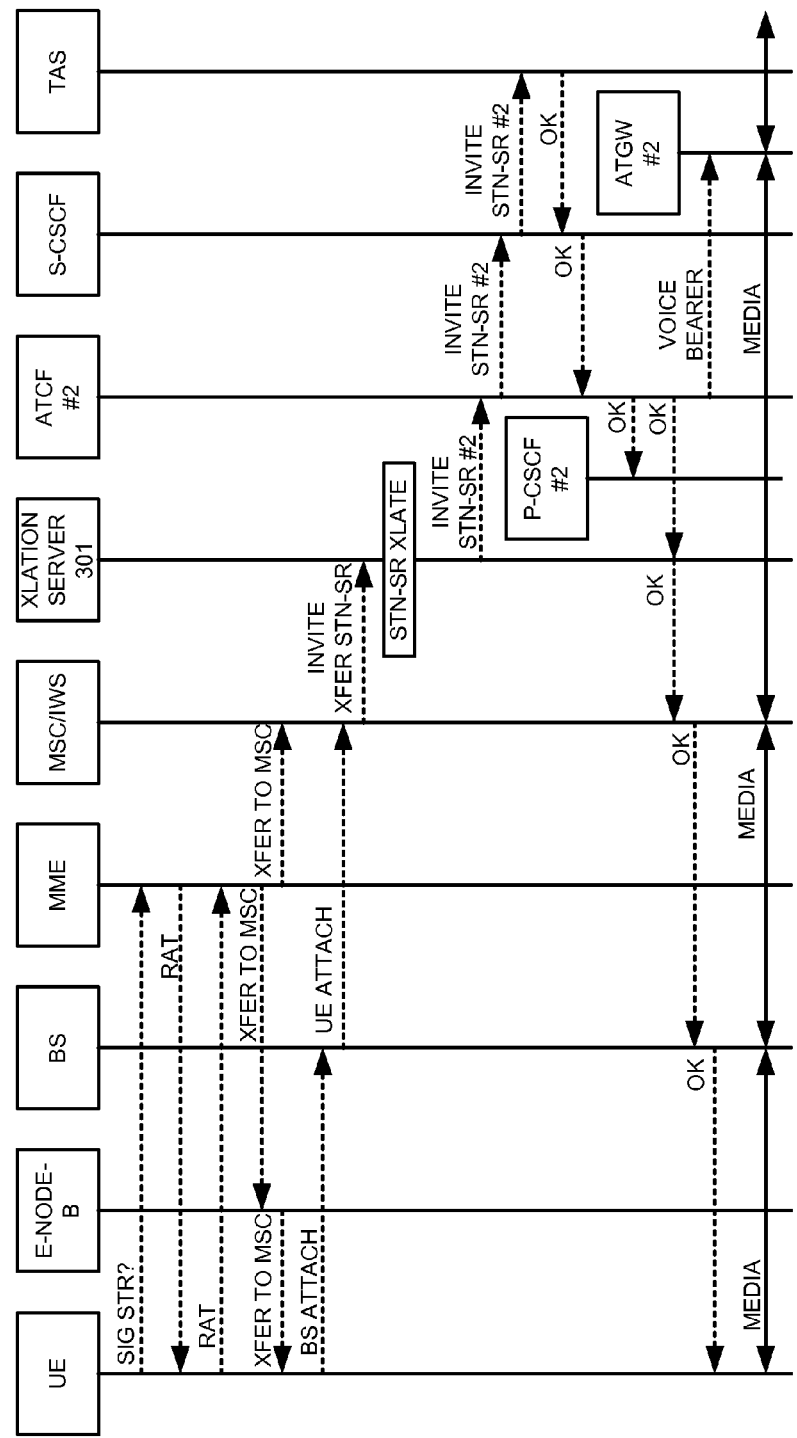
FIG. 8 illustrates the operation of the communication system having the translation server to transfer media sessions for User Equipment (UE) from a Long Term Evolution (LTE) network to a wireless voice network.

FIG. 8 illustrates the operation of communication system 300 to transfer media sessions for the UE from the LTE network to the wireless voice network. During a VoLTE session for a Single Radio Voice (SRV) UE, the SRV UE reports declining LTE signal strength to the eNodeB. The MME instructs the UE to perform Radio Access Technology measurements—including a radio signal measurements of the wireless base station. The UE returns the radio measurements to the MME, and in response, the MME determines to transfer the media session from the LTE network to the wireless voice network. For example, the eNodeB radio signal may be fading rapidly as the base station radio signal remains strong. The status of the UE as a Single Radio (SR) media device may be a factor in deciding to transfer the session.

The MME instructs the UE (through the eNodeB) to transfer the media session to the wireless base station (and the MSC). The UE then attaches to the wireless base station, and the base station informs the MSC of the UE attach. The MME instructs the MSC (through the control IWS) that the media session for the UE is transferring to the wireless base station and the MSC. In response to the session transfer and UE attach, the MSC transfers a SIP invite to translation server 301, where the invite is addressed to the general STN-SR that the MSC has recorded for the UE. Translation server 301 translates the general STN-SR received from the MSC into the specific STN-SR for ATCF #2 using its data structure (that associates the UE with P-CSCF #2 and P-CSCF #2 with ATCF #2).

ATCF #2 transfers the invite message to the S-CSCF, and the S-CSCF transfers the invite to the TAS which returns a corresponding SIP OK to the S-CSCF. The S-CSCF transfers the OK message for the voice session transfer to the ATCF #2, and the ATCF #2 transfers the OK to the P-CSCF #2 (which will direct subsequent session removal in the LTE system and is not shown for clarity). The ATCF #2 also transfers the SIP OK to the MSC through translation server 301. The ATCF #2 sends a session transfer instruction (with MSC information) to ATGW #2 for the UE.

In response to the SIP OK, the MSC transfers a session transfer message to the UE through the base station. The media session is then transferred from the eNodeB and P-GW to the wireless base station and MSC, so the media between the UE and the far-end system traverses the wireless base station, MSC, data IWS, and ATGW #2.

The STN-SR translation in translation server 301 allows for simplicity on the MSC side and complexity on the ATCF side by mapping general STN-SRs for groups of ATCFs into specific STN-SRs for specific ATCFs. For example, each core site in a national network could have a general STN-SR while the ATCFs at each site would retain a specific STN-SR. The translation allows ATCFs and P-CSCFs to be changed for a UE without forcing the updates to the HSS, MME, and MSC resulting in a significant reduction in Diameter messaging in some networks. The STN-SR update process can still be used to update the general STN-SRs, but is not needed as often.

In addition, the STN-SR translation in translation server 301 allows for transport and overhead efficiencies by using fewer SIP trunks between the MSCs and the ATCFs. The MSC can use a primary SIP trunk to each ATCF group, and allow the translation server to identify and connect the appropriate transfer server from the ATCF group. In the above example, the MSC could have a SIP trunk to each core site in a national network and use translation servers to connect to the proper ATCFs at each site on a per-session and per-UE basis.

Figure 9:
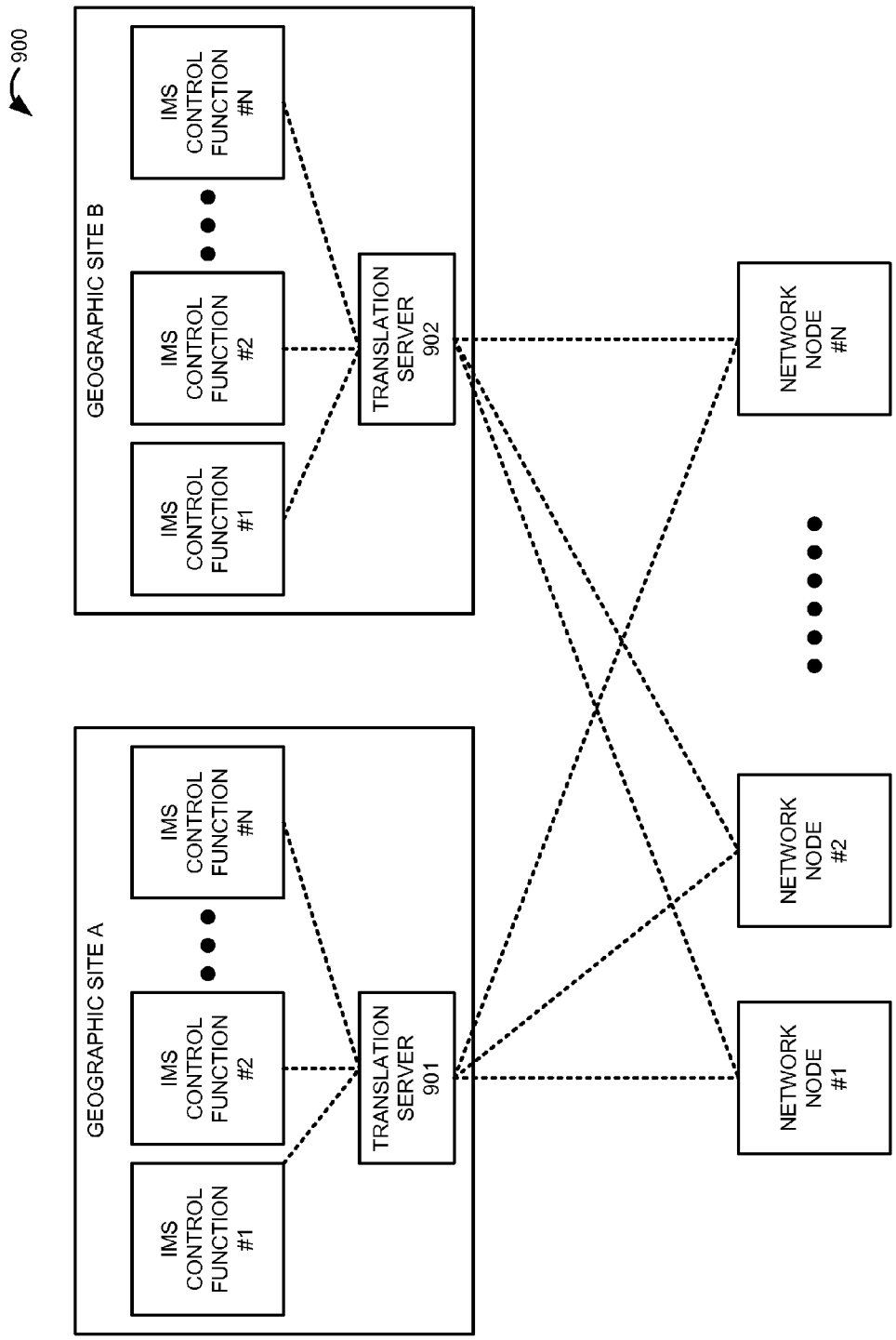
FIG. 9 illustrates an Internet Multimedia Subsystem (IMS) to transfer media sessions for wireless communication devices from one communication network to another.

FIG. 9 illustrates Internet Multimedia Subsystem (IMS) 900 to transfer media sessions for wireless communication devices from one communication network to another. Communication system 900 comprises translation servers 901-902 which are located at geographically diverse sites from one another. There could be many more sites that are configured and operate in a similar manner. Each site has multiple IMS control functions 1-N. Other IMS and media elements at the sites are omitted for clarity.

Translation servers 901-902 communicate with a plurality of network nodes 1-N. The number of illustrated network nodes is restricted for clarity, and network nodes may reside in various different networks, such as LTE, GSM, CDMA, WiFi, EVDO, HSPA, WiMAX, and the like. Translation servers 901-902 maintain data structures to associate individual wireless communication devices with individual IMS control functions, such as ATCFs, P-CSCFs, ATGWs, S-CSCFs, TAS, and the like.

The data structures in translation servers 901-902 yield accurate UE/CF translations on a per-session basis. The translations provided by servers 901-902 allow network nodes 1-N to access the correct IMS control function for a UE with little or no IMS information. Thus, translation servers 901-902 can reduce network updates by simplifying the IMS information that is pushed out to the network nodes. Translation servers 901-902 also reduce control link resources by aggregating the signaling links between the network nodes and IMS sites.

Figure 10:
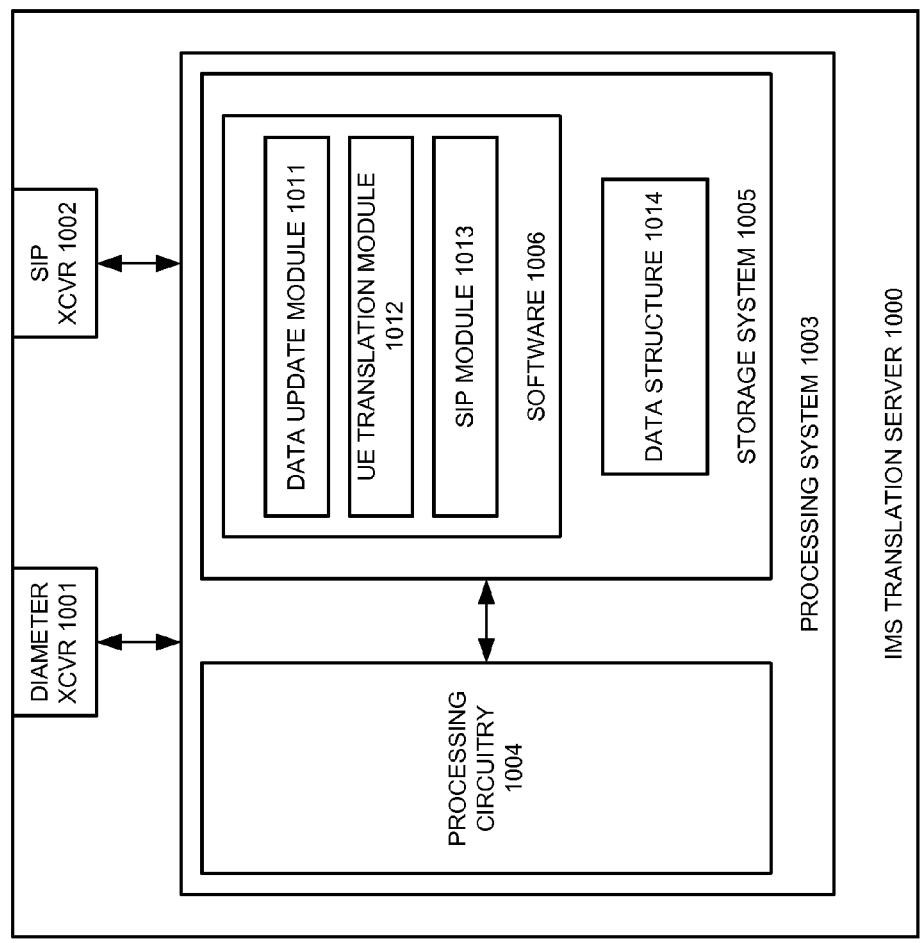
FIG. 10 illustrates an Internet Multimedia Subsystem (IMS) translation server to transfer media sessions between communication networks.

FIG. 10 illustrates IMS translation server 1000 to transfer media sessions between communication networks. IMS translation server 1000 is an example of systems 114, 301, and 901-902, although these systems may use alternative configurations and operations. IMS translation server 1000 comprises Diameter transceiver 1001, SIP transceiver 1002, and processing system 1003. Processing system 1003 comprises processing circuitry 1004 and storage system 1005. Storage system 1005 stores software 1006 and data structure 1014. Software 1006 includes software modules 1011-1013. Some conventional aspects of IMS translation server 1000 are omitted for clarity, such as power supplies, enclosures, and the like. IMS translation server 1000 may be centralized or distributed and may include various virtualized components.

Diameter transceiver 1001 and SIP transceiver 1002 comprise communication components, such as ports, signal processing circuitry, memory, software, and the like. Transceivers 1001-1002 may be integrated together. Diameter transceiver 1001 exchanges database updates with P-CSCFs to maintain current UE/P-CSCF associations and P-CSCF/ATCF associations in data structure 1014. SIP transceiver 1002 exchanges session messages with network nodes, such as MSCs, to implement media session transfers. SIP transceiver 1002 exchanges session messages with ATCFs to facilitate these session transfers.

In processing system 1003, processing circuitry 1004 comprises circuit boards, integrated circuitry, and associated electronics. Storage system 1005 comprises non-transitory, machine-readable, data storage media, such as flash drives, disc drives, memory circuitry, servers, and the like. Software 1006 comprises machine-readable instructions that control the operation of processing circuitry 1004 when executed. Software 1006 includes modules 1011-1013 and may also include operating systems, applications, utilities, databases, and the like. All or portions of software 1006 may be externally stored on one or more storage media, such as flash drives, discs, servers, and the like.

When executed by processing circuitry 1004, data update module 1011 directs circuitry 1004 to exchange Diameter messages with P-CSCFs to maintain current UE/P-CSCF associations and current P-CSCF/ATCF associations in data structure 1014. When executed by processing circuitry 1004, UE translation module 1012 directs circuitry 1004 to translate UE IDs into IMS control function addresses/numbers using data structure 1014. When executed by processing circuitry 1004, SIP module 1013 directs circuitry 1004 to exchange SIP messages between the network nodes and the IMS control functions while allowing UE translation module 1012 to enhance addressing information for the SIP messaging to the IMS control functions—possibly through the translation of session transfer numbers and/or IP addresses. Data structure 1014 maintains database associations between individual UEs-P-CSCFs-ATCFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system having multiple Internet Multimedia Subsystem (IMS) Session Control Servers and multiple IMS Transfer Control Servers that are individually associated, the method comprising:
   one of the IMS Session Control Servers receiving a media registration for a UE over a communication network;
   the one IMS Session Control Server establishing a media session for the UE over the communication network;
   an IMS Translation Server maintaining a data structure that individually associates the UE with the one IMS Session Control Server based on the registration and that individually associates the one IMS Session Control Server with one of the IMS Transfer Control Servers, wherein the IMS Translation Server does not comprise a Home Subscriber Server (HSS);
   the IMS Translation Server receiving a session transfer request for the one UE from another communication network indicating a general session transfer number for the multiple IMS Transfer Control Servers, processing the data structure to translate the general session transfer number for the multiple IMS Transfer Control Servers into an individual session transfer number for the one IMS Transfer Control Server, and responsively transferring the session transfer request for delivery to the one IMS Transfer Control Server; and
   the one IMS Transfer Control Server transferring the media session for the UE to the other communication network responsive to the session transfer request.

2. The method of claim 1 wherein processing the data structure to translate the general session transfer number for the multiple IMS Transfer Control Servers into an individual session transfer number for the one IMS Transfer Control Server comprises processing the data structure to translate a general session transfer number for a plurality of IMS Access Transfer Control Functions (ATCFs) into an individual session transfer number for one of the IMS ATCFs.

3. The method of claim 1 wherein receiving the media registration for the one UE comprises receiving a Voice over Long Term Evolution (VoLTE) registration.

4. The method of claim 1 wherein the communication network comprises a Long Term Evolution (LTE) network and the other communication network comprises one of a Code Division Multiple Access (CDMA) network and a Global System for Mobile communications (GSM) network.

5. The method of claim 1 wherein the one IMS Session Control Server comprises an IMS server.

6. The method of claim 1 wherein the one IMS Session Control Server comprises an IMS Call Session Control Function (CSCF).

7. The method of claim 1 wherein the one IMS Session Control Server comprises an IMS Proxy Call Session Control Function (P-CSCF).

8. The method of claim 1 wherein the one IMS Transfer Control Server comprises an IMS server.

9. The method of claim 1 wherein the one IMS Transfer Control Server comprises an IMS Access Transfer Control Function (ATCF).

10. A communication system having multiple Internet Multimedia Subsystem (IMS) Session Control Servers and multiple IMS Transfer Control Servers that are individually associated, the communication system comprising:
    one of the IMS Session Control Servers configured to receive a media registration for a UE over a communication network;
    the one IMS Session Control Server configured to establish a media session for the UE over the communication network;
    an IMS Translation Server configured to maintain a data structure that individually associates the UE with the one IMS Session Control Server based on the registration and that individually associates the one IMS Session Control Server with one of the IMS Transfer Control Servers, wherein the IMS Translation Server does not comprise a Home Subscriber Server (HSS);
    the IMS Translation Server configured to receive a session transfer request for the one UE from another communication network indicating a general session transfer number for the multiple IMS Transfer Control Servers, process the data structure to translate the general session transfer number for the multiple IMS Transfer Control Servers into an individual session transfer number for the one IMS Transfer Control Server, and responsively transfer the session transfer request for delivery to the one IMS Transfer Control Server; and
    the one IMS Transfer Control Server configured to transfer the media session for the UE to the other communication network responsive to the session transfer request.

11. The communication system of claim 10 wherein the IMS Translation Server configured to process the data structure to translate the general session transfer number for the multiple IMS Transfer Control Servers into an individual session transfer number for the one IMS Transfer Control Server comprises the IMS Translation Server configure to process the data structure to translate a general session transfer number for a plurality of IMS Access Transfer Control Functions (ATCFs) into an individual session transfer number for one of the IMS ATCFs.

12. The communication system of claim 10 wherein the media registration comprises an IMS Voice over Long Term Evolution (VoLTE) registration.

13. The communication system of claim 10 wherein the communication network comprises a Long Term Evolution (LTE) network and the other communication network comprises one of a Code Division Multiple Access (CDMA) network and a Global System for Mobile communications (GSM) network.

14. The communication system of claim 10 wherein the one IMS Session Control Server comprises an IMS server.

15. The communication system of claim 10 wherein the one IMS Session Control Server comprises an IMS Call Session Control Function (CSCF).

16. The communication system of claim 10 wherein the one IMS Session Control Server comprises an IMS Proxy Call Session Control Function (P-CSCF).

17. The communication system of claim 10 wherein the one IMS Transfer Control Server comprises an IMS server.

18. The communication system of claim 10 wherein the one IMS Transfer Control Server comprises an IMS Access Transfer Control Function (ATCF).

\* \* \* \* \*